(12) United States Patent
Chang et al.

(10) Patent No.: US 8,000,650 B2
(45) Date of Patent: Aug. 16, 2011

(54) RETRANSMISSION APPARATUS AND METHOD IN WIRELESS RELAY COMMUNICATION SYSTEM

(75) Inventors: Young-Bin Chang, Anyang-si (KR); Jae-Weon Cho, Suwon-si (KR); Eun-Taek Lim, Suwon-si (KR); Sung-Jin Lee, Seoul (KR); Mi-Hyun Lee, Seoul (KR); Hyun-Jeong Kang, Seoul (KR); Chang-Yoon Oh, Yongin-si (KR); Cheng Shan, Suwon-si (KR); Dong-Seek Park, Yongin-si (KR); Pan-Yuh Joo, Seoul (KR); Joon-Young Choi, Suwon-si (KR); Jae-Hyuk Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1025 days.

(21) Appl. No.: 11/807,737

(22) Filed: May 29, 2007

(65) Prior Publication Data

US 2007/0275657 A1 Nov. 29, 2007

(30) Foreign Application Priority Data

May 29, 2006 (KR) .................. 10-2006-0048379

(51) Int. Cl.
*H04B 7/15* (2006.01)

(52) U.S. Cl. ............... 455/11.1; 455/9; 455/7; 455/13.1

(58) Field of Classification Search ............. 455/11.1, 455/13.1, 7, 424, 425, 517, 553.1, 12.1, 422.1, 455/552.1, 456.5, 561.9, 9, 412.1, 450, 509, 455/91, 130; 370/315, 319, 466, 348, 260, 370/329, 210, 252; 375/211, 260, 340
See application file for complete search history.

(56) References Cited

U.S. PATENT DOCUMENTS

| 5,699,367 A | * | 12/1997 | Haartsen | ................ 714/749 |
| 2003/0108031 A1 | | 6/2003 | Inden | |
| 2004/0010736 A1 | | 1/2004 | Alapuranen | |
| 2005/0232183 A1 | * | 10/2005 | Sartori et al. | ............. 370/319 |
| 2006/0046643 A1 | * | 3/2006 | Izumikawa et al. | ............. 455/7 |
| 2008/0070582 A1 | * | 3/2008 | Cai | ................ 455/450 |
| 2008/0285500 A1 | * | 11/2008 | Zhang et al. | ............. 370/315 |

(Continued)

FOREIGN PATENT DOCUMENTS

JP 2003-018069 1/2003
(Continued)

OTHER PUBLICATIONS

IEEE Standard for Local and Metropolitan Area Networks, Part 16: Air Interface for Fixed Broadband Wireless Access Systems, IEEE Std 802.16, Oct. 1, 2004.

*Primary Examiner* — Tan Trinh
(74) *Attorney, Agent, or Firm* — The Farrell Law Firm, P.C.

(57) ABSTRACT

An apparatus and method for performing Automatic Retransmission reQuest (ARQ) of a Relay Station (RS) in a wireless communication system using a relay scheme are provided. The method includes receiving data from a transmitter and transmitting the received data to one or more receivers; and receiving Acknowledgment (ACK)/Negative-Acknowledgment (NACK) information for the data received from the one or more receivers and transmitting the received ACK/NACK information to a Base Station (BS).

37 Claims, 11 Drawing Sheets

U.S. PATENT DOCUMENTS

| | | | |
|---|---|---|---|
| 2008/0305740 A1* | 12/2008 | Horiuchi et al. | 455/11.1 |
| 2009/0003378 A1* | 1/2009 | Sachs | 370/466 |
| 2009/0092072 A1* | 4/2009 | Imamura et al. | 370/315 |
| 2009/0252145 A1* | 10/2009 | Meylan et al. | 370/348 |
| 2010/0017672 A1* | 1/2010 | Suga | 714/748 |

FOREIGN PATENT DOCUMENTS

| | | |
|---|---|---|
| KR | 1020040104775 | 12/2004 |
| WO | WO 2006/024321 | 3/2006 |

* cited by examiner

RETRANSMISSION APPARATUS AND METHOD IN WIRELESS RELAY COMMUNICATION SYSTEM

PRIORITY

This application claims priority under 35 U.S.C. §119(a) to a Korean Patent Application filed in the Korean Intellectual Property Office on May 29, 2006 and assigned Serial No. 2006-48379, the contents of which are incorporated herein by reference.

BACKGROUND OF THE INVENTION

1. Field of the Invention

The present invention relates to an apparatus and method for performing Automatic Retransmission reQuest (ARQ) in a wireless communication system, and in particular, to an apparatus and method for performing ARQ in a wireless communication system using a relay scheme.

2. Description of the Related Art

In a conventional wireless communication system, data communication is achieved through a direct link between a fixed Base Station (BS) and a Mobile Station (MS). However, since the location of the BS is fixed in the wireless communication system, a wireless network architecture has a low flexibility when environments change between the BS and the MS. Thus, there is a demerit in that communication services cannot be effectively provided in a wireless environment where traffic distribution and call demands are rapidly changed.

To address this shortcoming, the aforementioned conventional cellular wireless communication system may employ a data transmission method based on a multi-hop relay scheme by using a fixed or movable Relay Station (RS) and a general MS. In the wireless communication system based on the multi-hop relay scheme, a network can be rapidly reconfigured in response to a change in the surrounding environment, and the entire wireless network can be further effectively managed. For example, the wireless communication system based on the multi-hop relay method can broaden a cell service coverage and increase a system capacity. When a channel quality is poor between a BS and an MS, an RS may be installed between the BS and the MS so that a multi-hop relay path is formed via the RS. By doing so, a wireless channel having a better channel quality can be provided to the MS. Moreover, by using the multi-hop relay scheme, the BS can provide a high-speed data channel in a cell boundary region having a poor channel quality and also can extend the cell service coverage.

According to a channel quality in a wireless segment in the wireless data communication, errors may occur in specific data. An error control/recovery technique may use an Automatic Retransmission reQuest (ARQ) scheme or a Frame Error Check (FEC) scheme. In the ARQ scheme, erroneous data is retransmitted by a transmitting end at the request of a receiving end. In the FEC scheme, the erroneous data is corrected.

When the ARQ scheme is used, a result obtained by checking packet errors, for example, using Cyclic Redundancy Check (CRC), has to be fed back from a receiving end to a transmitting end. When a packet is initially transmitted from the transmitting end, the receiving end decodes the received packet. In this case, if no error is detected, an ACK signal is transmitted to the transmitting end, and otherwise, a NACK signal is transmitted to the transmitting end. In response to the ACK/NACK signals received from the receiving end, the transmitting end may retransmit a previous packet or transmit a new packet. In this case, the transmitting end transmits a new packet upon receiving the ACK signal, and transmits a previous packet upon receiving the NACK signal.

For reliable data transmission, the wireless communication system generally employs two retransmission methods. One is a 'Media Access Control (MAC) ARQ' operating in a MAC layer, and the other is a 'Hybrid ARQ (HARQ)' operating in a Physical (PHY) layer. The conventional MAC ARQ scheme will now be described.

FIG. 1 illustrates a signal exchange process when ARQ is performed in a wireless communication system using a conventional analog RS. The conventional RS will hereinafter be referred to as a repeater.

The conventional wireless communication system is constructed of at least one BS, at least one repeater, and at least one MS. For convenience of description, one BS 10, one repeater 11, and one MS 12 are depicted in FIG. 1. It will be assumed that the BS 10 transmits to the MS 12 two MAC Protocol Data Units (hereinafter, MAC PDUs), and the MS 12 receives data via the repeater 11.

In FIG. 1, in step 101, the BS 10 generates one PHY layer data (or PHY DATA) 1 using two MAC PDUs and transmits it to the repeater 11. Each MAC PDU, that is, a data transmission unit of a MAC layer, includes a MAC header, a payload containing actual data, and an error check code (e.g., CRC code) for detecting errors of the payload. The PHY DATA 1 includes at least one MAC PDU.

In step 103, the repeater 11 simply amplifies the amplitude of a signal containing the PHY DATA 1 received from the BS 10 and relays the amplified signal (indicated by PHY DATA 2 in the figure) to the MS 12.

In step 105, the MS 12 separates MAC PDUs from the PHY DATA 1 received from the repeater 11 and checks errors of each MAC PDU. The error checking is performed using the CRC code included in the MAC PDU. The MS 12 generates an error check code by using the payload of the received MAC PDU and compares the generated error check code with the received error check code, thereby detecting errors. It will be assumed that errors are detected from the MAC PDU 2 among the separated MAC PDUs.

In the case where the MAC PDU 1 is errorless data and the MAC PDU 2 is erroneous data, in step 107, the MS 12 transmits a control-message so that an Acknowledgment (ACK) response is provided for the MAC PDU 1, and a Negative-Acknowledgment (NACK) response is provided for the MAC PDU 2. In step 109, the repeater 11 amplifies again the amplitude of a signal containing the control-message received from the MS 12 and then relays it to the BS 10.

Also, in step 109, the BS 10 analyzes the control-message received from the repeater 11 and determines which MAC PDU is requested to be retransmitted. Herein, the MAC PDU 2 is determined to be retransmitted. In step 111, the BS 10 generates PHY retransmission data by using the MAC PDU 2 requested to be retransmitted, and then transmits it to the repeater 11. In step 113, the repeater 11 simply amplifies the amplitude of a signal containing the PHY retransmission data received from the BS 11 and relays it to the MS 12. Accordingly, the MS 12 requests the BS 11 to retransmit erroneous data via the repeater 11, and then receives the retransmitted data via the repeater 11.

As described above, the conventional repeater simply amplifies the amplitude of an analog signal received from a BS and then relays it to an MS. However, such repeater simply performing a relay function is not efficient considering that an intelligent RS is expected to be used in the near future. The intelligent RS can independently make a decision and utilize resources rather than simply relaying a signal received from the BS. In other words, in the future, unlike the convention repeater, an RS operating both in a MAC layer and a PHY layer will be used. Since the RS can analyze messages exchanged between a BS and an MS, it is more effective than the convention relay scheme in which a transmission signal is simply amplified. Accordingly, there is a need for an ARQ operation method in consideration of such intelligent RS.

SUMMARY OF THE INVENTION

An aspect of the present invention is to substantially solve at least the above problems and/or disadvantages and to provide at least the advantages described below. Accordingly, one aspect of the present invention is to provide an apparatus and method for retransmitting data using a Relay Station (RS) in a wireless communication system.

According to one aspect of the present invention, there is provided a method of operating Automatic Retransmission reQuest (ARQ) of an RS in a wireless communication system using a relay scheme. The method includes receiving data from a transmitter and transmitting the received data to one or more receivers; and receiving Acknowledgment (ACK)/Negative-Acknowledgment (NACK) information for the data received from the one or more receivers and transmitting the received ACK/NACK information to a Base Station (BS).

According to another aspect of the present invention, there is provided a method of operating ARQ of a transmitter in a wireless communication system using a relay scheme. The method includes transmitting data received from a receiver to an RS; and if Rely Station-NACK (R-NACK) information for the data is received from the RS, retransmitting the data to the RS, and if Relay Station-Acknowledgement (R-ACK) information for the data is received from the RS, checking whether receiver-ACK information for the data is received from the RS.

According to another aspect of the present invention, there is provided an apparatus for operating ARQ of an RS in a wireless communication system using a relay scheme. The apparatus includes a receiver unit for receiving data from a transmitter and for receiving ACK/NACK information for the data from one or more receivers; and a transmitter unit for transmitting the data received from the transmitter, and transmitting to a BS the ACK/NACK information received from the one or more receivers.

According to another aspect of the present invention, there is provided a method of operating ARQ of an RS in a wireless communication system using a relay scheme. The method includes receiving data from a transmitter, generating R-ACK/R-NACK information for the received data, and transmitting the generated R-ACK/R-NACK information to a BS; and receiving ACK/NACK information equivalent to the R-ACK/R-NACK information from the BS, and transmitting the received ACK/NACK information to a receiver.

According to another aspect of the present invention, there is provided a method of operating ARQ of a BS in a wireless communication system using a relay scheme. The method includes receiving, from an RS, R-ACK/R-NACK information for data transmitted by a transmitter; and generating ACK/NACK information equivalent to the received R-ACK/R-NACK information, and transmitting the generated ACK/NACK information to the RS.

According to another aspect of the present invention, there is provided an apparatus for operating ARQ of an RS in a wireless communication system using a relay scheme. The apparatus includes a receiver unit for receiving data from a transmitter and then receiving, from a BS, ACK/NACK information equivalent to R-ACK/R-NACK information; and a transmitter unit for generating the R-ACK/R-NACK information for the data received from the transmitter, transmitting the generated R-ACK/R-NACK information to the BS, and then transmitting to the receiver the ACK/NACK information received from the BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Terminology used herein should be determined in consideration of functionality of the present invention, and it may be variable depending on a user's or operator's intention, or customs in the art. Therefore, corresponding meaning should be determined with reference to the entire specification.

An apparatus and method for performing Automatic Retransmission request (ARQ) in a wireless communication system will be described below.

The ARQ may be either a Media Access Control (MAC) ARQ operating in a MAC layer or a Hybrid ARQ (HARQ) operating in a Physical (PHY) layer.

A wireless communication system using a relay scheme may employ an Orthogonal Frequency Division Multiplexing (OFDM) scheme or an Orthogonal Frequency Division Multiple Access (OFDMA) scheme. Although a broadband wireless access communication system using multiple carriers will be explained as an example in the following descriptions, the present invention may also apply to other cellular-based communication systems employing a multi-hop relay scheme.

A Relay Station (RS) of the wireless communication system using the relay scheme may be either a fixed node or a movable node. Further, the RS may be a specific system installed by a provider. Any node can be selected as an RS according to a predefined standard through a capacity negotiation procedure between the RS and a Base Station (BS), wherein the standard is defined so that the BS can broaden a cell coverage and improve a cell capacity.

Figure 1:
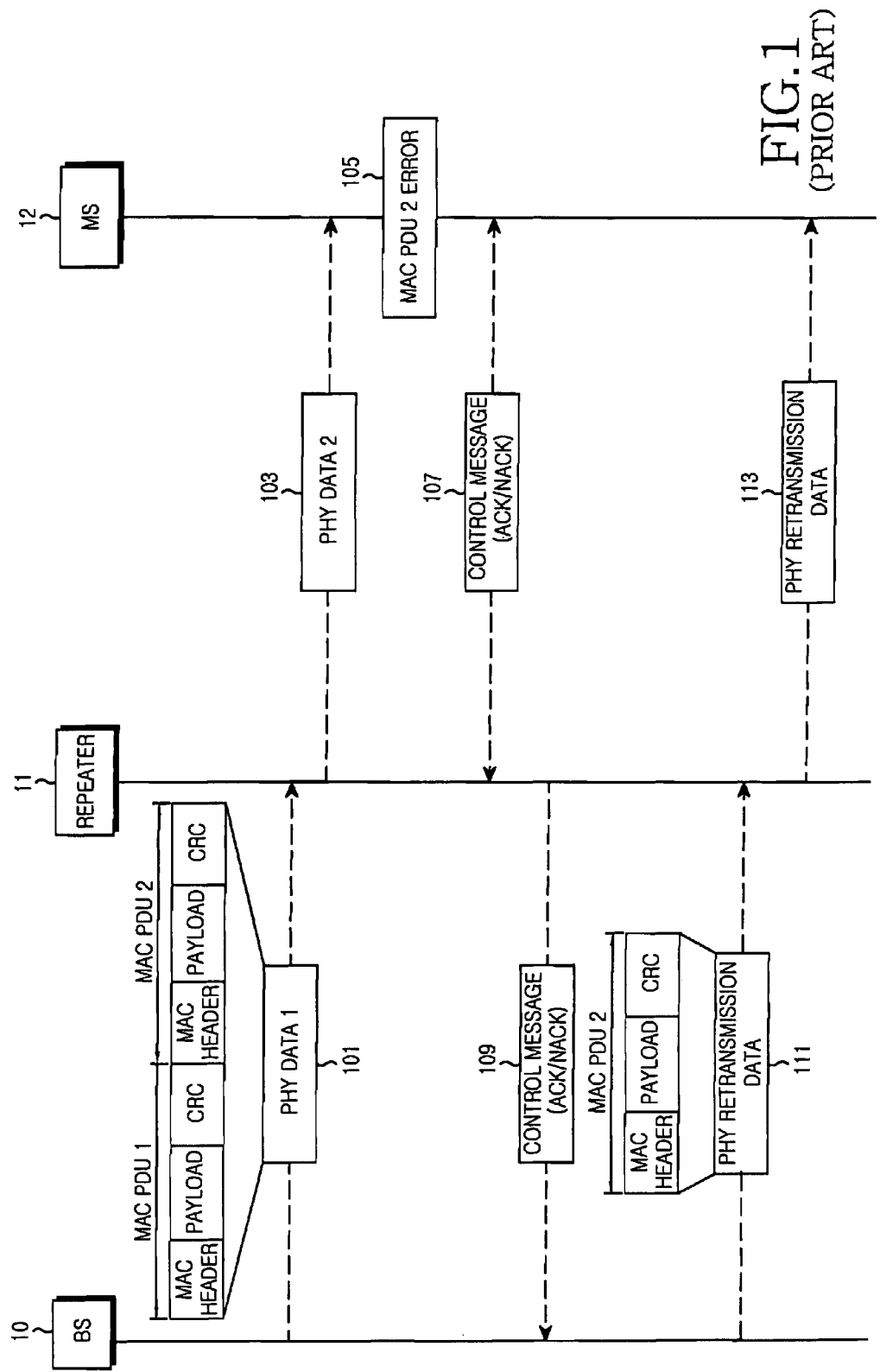
FIG. 1 illustrates a signal exchange process when Automatic Retransmission reQuest (ARQ) is performed in a wireless communication system using a conventional analog Relay Station (RS)
Figure 2:
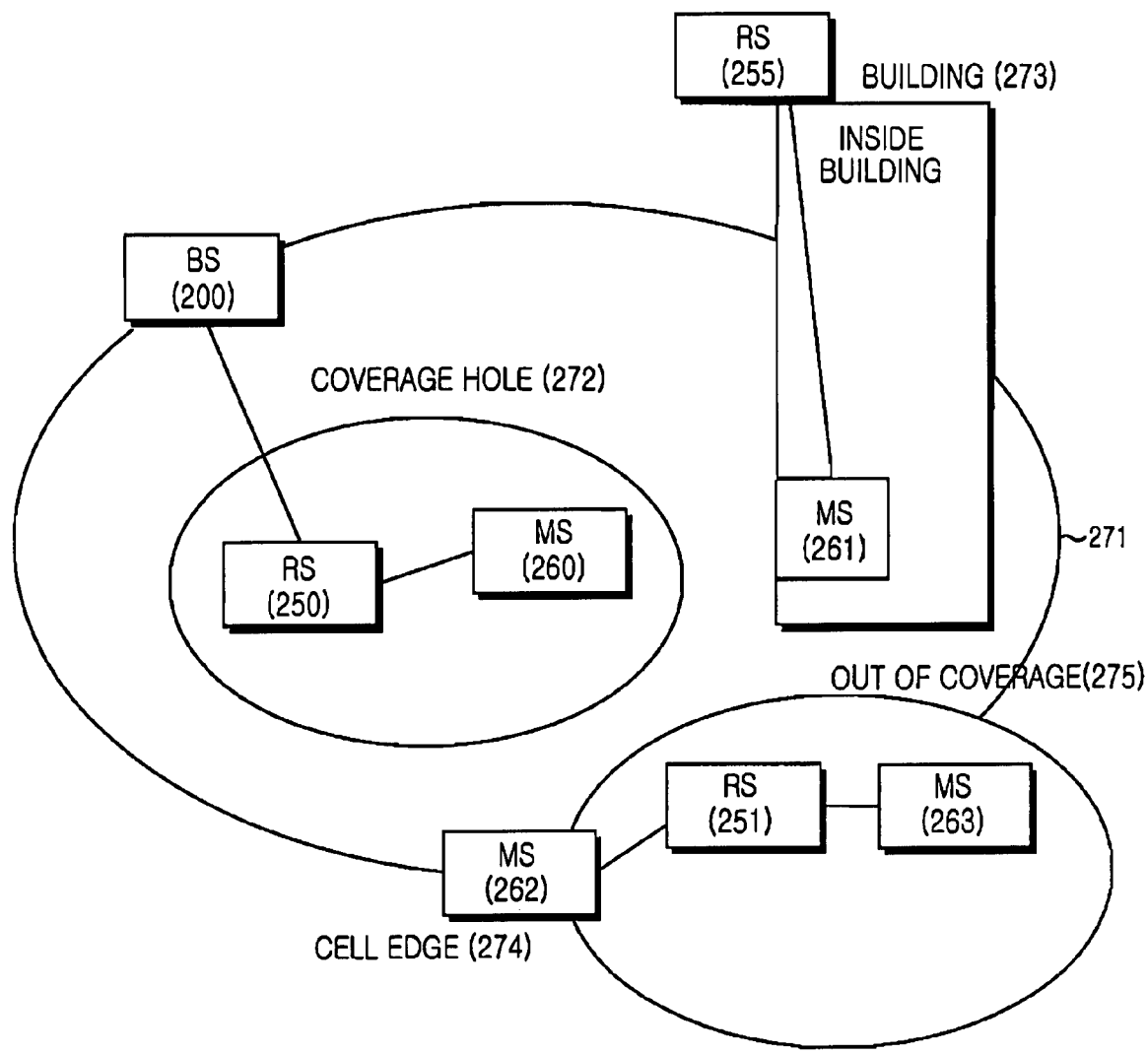
FIG. 2 illustrates a configuration of a wireless communication system using a relay scheme, according to the present invention.

FIG. 2 illustrates a configuration of a wireless communication system using a relay scheme, according to the present invention.

In FIG. 2, the wireless communication system includes a BS 200, RSs 250, 251, and 255, and Mobile Stations (MSs) 260, 261, 262, and 263. The BS 200 provides a service within a cell coverage 271, in some areas, however, in order to achieve smooth data communication, the MSs 260, 261, 262, and 263 may communicate with the RSs 250, 251, and 255 other than the BS 200.

Examples of such area include: 1) a coverage hole 272 of the cell coverage 271, which is an area where radio waves cannot be easily arrived, e.g., a metropolitan subway or a passage between buildings; 2) an area within a building 273 of the cell coverage 271; 3) a cell edge 274 of the cell coverage 271; and 4) an out-of-coverage 275 of the cell coverage 271. Since it is difficult for the MSs 260, 261, 262, and 263 existing in the areas 272, 273, 274, and 275 to directly receive a signal transmitted from the BS 200, the MSs 260, 261, 262, and 263 perform data communication via the RSs 250, 251 and 255.

In the present invention, the wireless communication environment is regarded such that, as shown in FIG. 2, data communication between a BS and an MS is not smoothly achieved, and thus the MS communicates with an RS instead of the BS in order to transmit/receive data and a control-message.

Figure 3A:
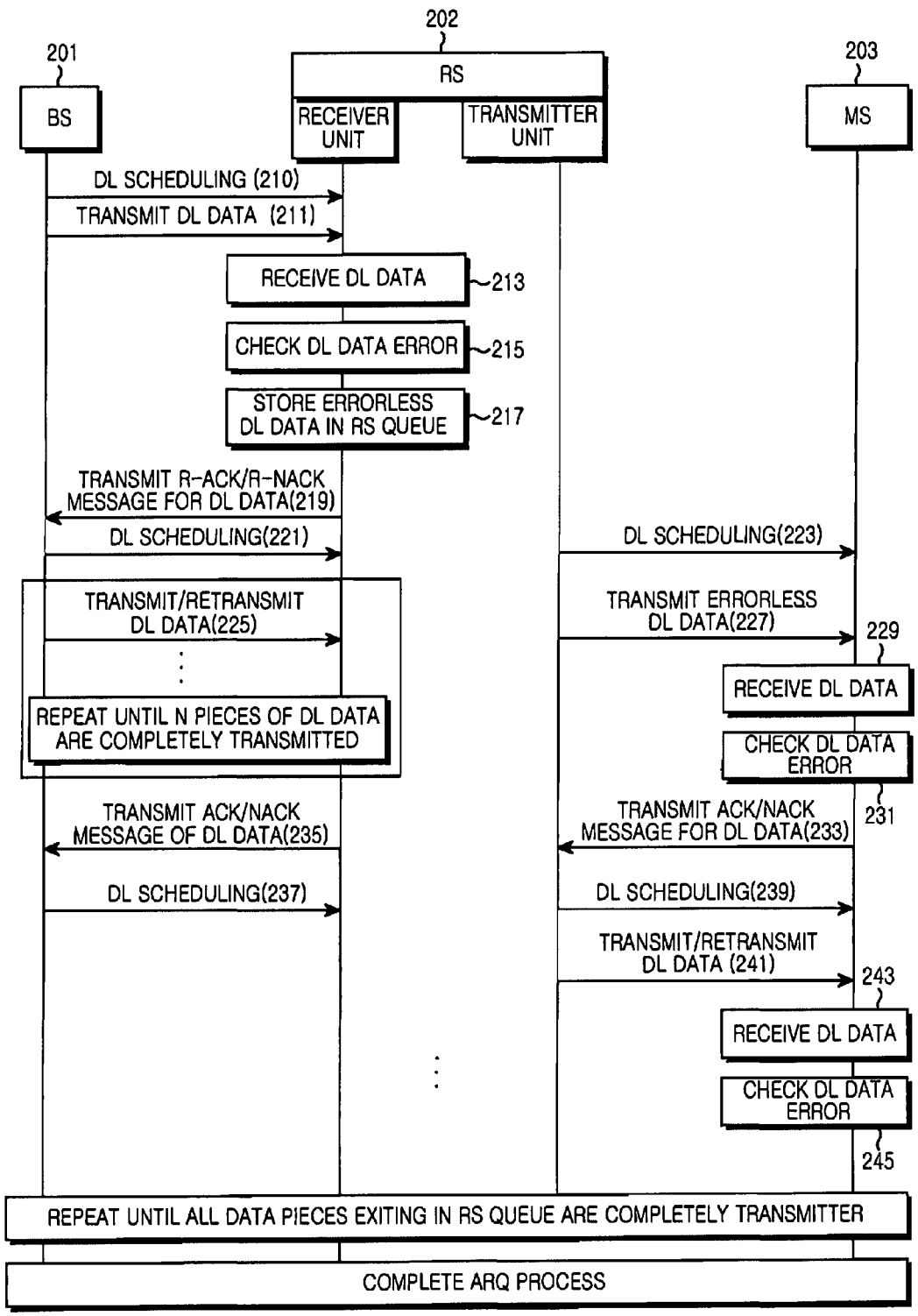
FIG. 3A illustrates an ARQ process performed when downlink data is transmitted in a wireless communication system using a relay scheme, according to the present invention.

FIG. 3A illustrates an ARQ process performed when downlink data is transmitted in a wireless communication system using a relay scheme, according to the present invention.

The descriptions below will be given under the assumptions as follows. A total of N pieces of data (or Packet Date Unit (PDU)) to be transmitted to an MS 203 are stored in a data queue of a BS 201. A total of K pieces of data can be transmitted at the same time. The MS 203 cannot receive data directly from the BS 201. Thus, the MS 203 receives data only through an RS 202.

In FIG. 3A, in step 210, the BS 201 transmits to the RS 202 scheduling information (e.g., downlink map) for transmitting downlink data to the RS 202.

In step 211, the BS 201 transmits to the RS 202 the K pieces of data out of the N pieces of data according to the scheduling information. In step 213, the RS 202 receives the K pieces of data from the BS 201. In step 215, the RS 202 detects errors from the respective K pieces of data received. It will be assumed that errors are detected from J pieces of data out of the K pieces of data. In step 217, the RS 202 stores (K-J) pieces of errorless data in an RS queue. In step 219, the RS 202 transmits to the BS 201 Acknowledgment (ACK) information upon receiving errorless data. When the J pieces of erroneous data are received, the RS 202 transmits to the BS 201 Negative-Acknowledgment (NACK) information so as to request retransmission of the J pieces of erroneous data.

The BS 201 analyzes the ACK/NACK information received from the RS 202 in step 219. Hereinafter, ACK/NACK information received from an RS will be referred to as 'R-ACK/R-NACK' information. In step 221, the BS 201 transmits downlink scheduling information to the RS 202 so that data can be retransmitted when the R-NACK is received and so that data can be transmitted from the RS 202 and to the 203 when the R-ACK information is received. The scheduling information for transmitting data from the RS 202 to the MS 203 may be transmitted from the BS 201 to the MS 203 via the RS 202 or may be directly transmitted from the BS 201 to the MS 203. Even if the scheduling information is directly transmitted from the BS 201 to the MS 203, the RS 202 can receive the scheduling information transmitted from the BS 201.

In step 225, the BS 201 retransmits the J pieces of erroneous data to the RS 202. While retransmitting the J pieces of data, the BS 201 may transmit a possible number of pieces of data among (N-K) pieces of data stored in the queue as new data together with the J pieces of data. In this case, the downlink scheduling information includes not only data to be retransmitted but also additional downlink scheduling information for the new data. After step 221, steps 225, 213, 215, 217, 219, and 221 are repeated by the BS 201 and the RS 202 until N pieces of data existing in the queue of the BS 201 is completely transmitted to the RS 202 without data loss.

In step 223, the RS 202 transmits again to the MS 203 the downlink scheduling information, which has been received in step 221, for transmitting data from the RS 202 to the MS 203. Step 223 may be skipped when the downlink scheduling information is directly transmitted from the BS 201 to the MS 203 in step 221. In step 227, the RS 202 transmits to the MS 203 data stored in an RS queue according to the downlink scheduling information used in step 221 or 223.

In step 229, the MS 203 receives data from the RS 202. In step 231, the MS 203 decodes the data and detects errors from the data. If errors are detected from P pieces of data among data received, in step 233, the MS 203 transmits retransmission request information (ACK/NACK information) for the P pieces of data to the RS 202.

In step 235, the RS 202 transmits to the BS 201 the ACK/NACK information received from the MS 203. In step 237, by using the ACK/NACK information received from the RS 202, the BS 201 transmits to the RS 202 the downlink scheduling information for transmitting data from the RS 202 to the MS 203. Alternatively, the downlink scheduling information may be directly transmitted from the BS 201 to the MS 203. Even in this case, the RS 202 can receive the scheduling information transmitted from the BS. The scheduling information may include scheduling information for transmitting data from the BS 201 to the RS 202 and/or scheduling information for transmitting data from the RS 202 to the MS 203.

In step 239, the RS 202 relays again to the MS 203 the scheduling information for transmitting downlink data from the RS 202 to the MS 203. Step 239 may be skipped when the scheduling information is directly transmitted from the BS 201 to the MS 203 in step 237. In step 241, the RS 202 retransmits to the MS 203 the P pieces of erroneous data stored in the RS queue. In this case, the RS 202 may also transmit new data stored in the RS queue to the MS 203. In step 243, the MS 203 receives data retransmitted from the RS 202. In step 245, the MS 203 detects errors of the received data. Steps 233, 239, 241, 243, and 245 are repeated by the RS 202 and the MS 203 until data existing in the RS queue is completely transmitted to the MS 203 without loss.

In one embodiment of the present invention, the R-ACK/R-NACK information transmitted from the RS 202 to the BS 201 may have a message format as shown in Table 1 below. Such R-ACK/R-NACK information having a message format will hereinafter be referred to as an R-ACK/R-NACK message.

TABLE 1

| Syntax | Size | Note |
| --- | --- | --- |
| CID | XX bit | RS CID |
| ACK Type | XX bit | ACK Type managed between BS and RS |
| BSN | XX bit | BSN managed between BS and RS |
| ACK MAP | XX bit | ACK bit map in case of selective ACK |
| ... | ... | ... |

In Table 1, the R-ACK/R-NACK message includes a Connection ID (CID) of an RS from which the R-ACK/R-NACK message is currently being transmitted, an ACK type for designating a response type, a Block Sequence Number (BSN) for designating a sequence number of an ARQ block, and, if the response type is a selective ACK, an ACK map for designating whether each ARQ block has been successfully received. The CID indicates an identifier of the RS or an identifier of a specific service provided to the RS. According to the CID, the BS distinguishes an RS from a service. The ACK type may be either a selective ACK or a cumulative ACK. However, the ACK type is not limited thereto, and thus other various types may also be used.

For example, if the R-ACK/R-NACK message transmitted from the RS 202 to the BS 201 has a format in which CID is 12 and ACK type is the selective ACK, the BSN indicates a first bit of the ACK map. If BSN=10, ACK MAP=1011, ACK=1, and NACK=0, it means that $10^{th}$, $12^{th}$, and $13^{th}$ data pieces among data provided from the RS (CID=12) has been successfully received, and $11^{th}$ data piece has an error. If ACK type is the cumulative ACK and BSN=10, it means that $1^{st}$ to $10^{th}$ data has been successfully received among service data of an RS (CID=12).

In another embodiment of the present invention, the ACK/NACK information transmitted from the MS 203 to the RS 202 in step 233 may have a message format as shown in Table 2 below. Such ACK/NACK information having a message format will hereinafter be referred to as an ACK/NACK message.

TABLE 2

| Syntax | Size | Note |
| --- | --- | --- |
| CID | XX bit | MS CID |
| ACK Type | XX bit | ACK Type managed between BS and MS |
| BSN | XX bit | BSN managed between BS and MS |
| ACK MAP | XX bit | ACK bit map in case of selective ACK |
| ... | ... | ... |

In Table 2, the ACK/NACK message includes a CID of an MS from which the ACK/NACK message is currently being transmitted, an ACK type for designating a response type, a BSN for designating a sequence number of an ARQ block, and an ACK map for designating whether each ARQ block has been successfully received when the response type is a selective ACK. The CID indicates an identifier of the MS or an identifier of a specific service provided to the MS. The ACK type may be either a selective ACK or a cumulative ACK. However, the ACK type is not limited thereto, and thus other various types may also be used.

Since ARQ is controlled by the BS, the BSN and the ACK type shown in Table 2 are managed by the BS and the MS while the RS only relays information on the BSN and the ACK type.

In step 233, the RS 202 may relay to the BS 201 the ACK/NACK information received from the MS 203 without alteration. However, if the MS 203 transmitting the ACK/NACK information to the RS 202 is provided in a plural number, it is not effective way to retransmit the ACK/NACK information from the RS 202 to the BS 201 since a plurality of pieces of ACK/NACK information are received from the plurality of MSs 203. In other words, in step 235, when a plurality of pieces of ACK/NACK information are transmitted from the RS 202 to the BS 201, the same ACK type may be used by some MSs 203. This is inefficient since the same ACK type is repeatedly used. Therefore, to address this problem, in another embodiment of the present invention, the ACK/NACK information transmitted from the RS 202 to the BS 201 may have a message format including at least parameters shown in Table 3 below.

TABLE 3

| Syntax | Size | Notes |
| --- | --- | --- |
| Number of ACK Types | XX bit | |
| for(i=0;i<Number of ACK Types+1;++i){ | | |
| ACK Type | XX bit | |
| Number of CIDs | XX bit | The number of users who use same ACK type |
| for( j=0;j<Number of CIDs+1;++j){ | | |
| CID | XX bit | MS CID |
| BSN | XX bit | |
| ACK MAP | XX bit | |
| ... | ... | ... |

In Table 3, 'Number of ACK Types' is a parameter indicating the number of ACK types. A 'for syntax' is created for each ACK type, and 'ACK type' is described within the created 'for syntax'. In addition, 'Number of CIDs' is a parameter for indicating the number of MSs (or users) using the 'ACK type'. A 'for syntax' is created for each CID, and unique ARQ information (e.g., CID, BSN, ACK MAP, etc.) of MS is described within the created 'for syntax'.

When the RS 202 transmits to the BS 201 a retransmission request message (ACK/NACK message) received from one or more MSs 203, the RS 202 may generate one message shown in Table 3 from all retransmission request messages (ACK/NACK messages) received in a current uplink segment for the MSs 203. Thus, an ARQ feedback message is transmitted in a further effective manner. In particular, when a plurality of MSs 203 having the same ACK type are provided, overhead can be significantly reduced as compared with the case when respective messages of Table 3 are separately generated and transmitted.

When data is transmitted on a real-time basis, an RS has to immediately transmit to a BS, in an RS uplink segment, a retransmission request message which is received in the current uplink segment. On the other hand, when data is transmitted on a non-real-time basis, retransmission request messages, which are received from a plurality of MSs in an uplink segment, may be stored in the RS queue so as to be concurrently transmitted to the BS using the messages shown in Table 3.

Figure 3B:
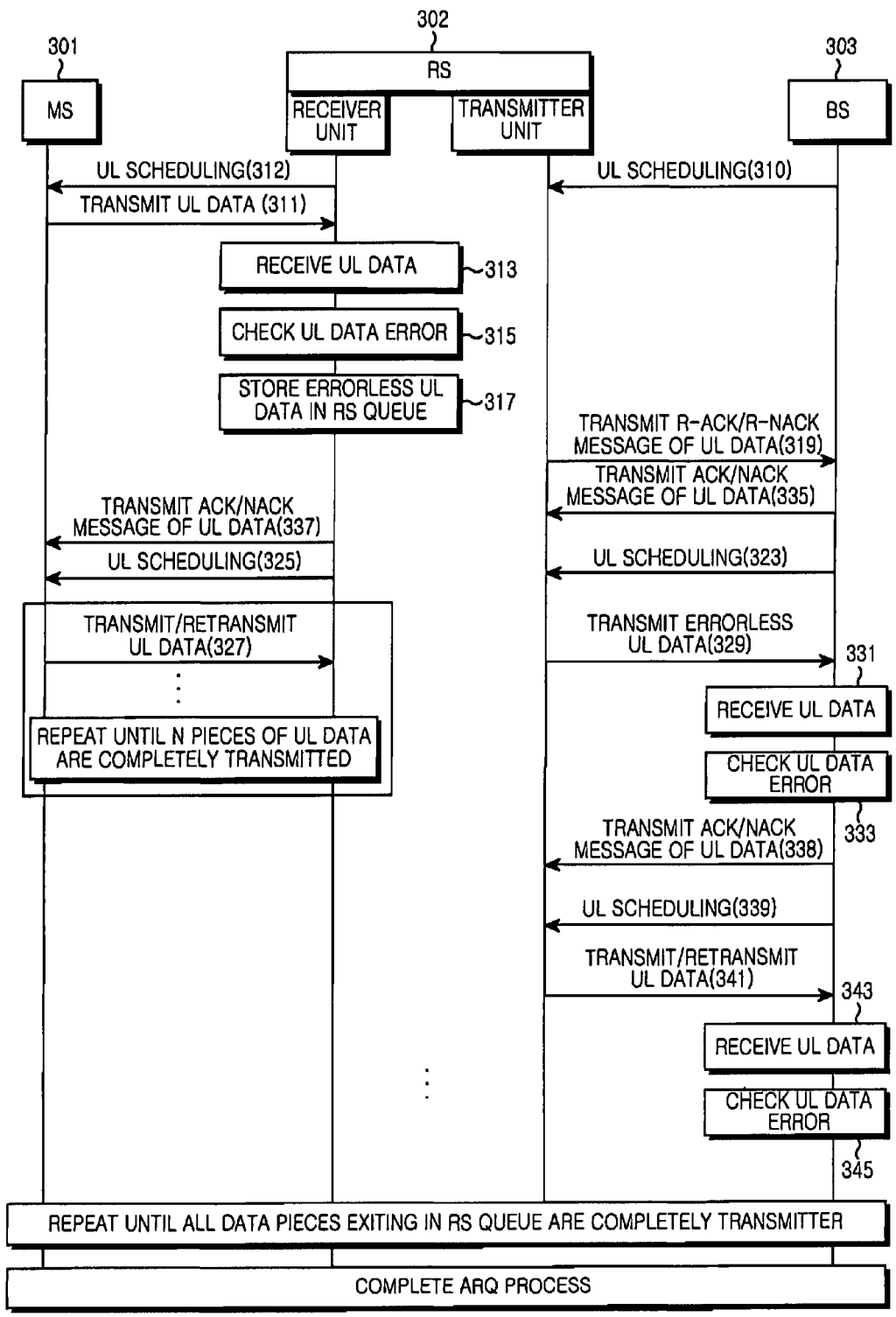
FIG. 3B illustrates an ARQ process performed when uplink data is transmitted in a wireless communication system using a relay scheme, according to the present invention.

FIG. 3B illustrates an ARQ process performed when uplink data is transmitted in a wireless communication system using a relay scheme, according to the present invention.

The descriptions below will be given under the assumptions as follows. A total of N pieces of data (or PDU) to be transmitted to a BS 303 is stored in a data queue of an MS 301. A total of K pieces of data can be transmitted at the same time. The BS 303 cannot receive data directly from the MS 301. Thus, the BS 3203 receives data via an RS 302.

In FIG. 3B, in step 310, the BS 303 transmits scheduling information (e.g., uplink map) for transmitting uplink data from the MS 301 to the RS 302. In step 312, the RS 302 relays the scheduling information received from the BS 303 to the MS 301. Alternatively, in step 310, the scheduling information for transmitting uplink data may be directly transmitted from the BS 303 to the MS 301. Even in this case, the RS 302 can receive the scheduling information transmitted from the BS 303, without performing step 312.

In step 311, the MS 301 transmits to the RS 302 K pieces of data out of a total of N pieces of data according to the scheduling information. In step 313, the RS 302 receives the K pieces of data from the MS 301. In step 315, the RS 302 detects errors for the respective K pieces of data received. In step 317, the RS 302 stores errorless data in an RS queue.

The RS 302 transmits errorless data stored in the RS queue to the BS 303 and requests the MS 301 to retransmit erroneous data.

The retransmission request process will now be described. In step 319, the RS 302 transmits R-ACK/R-NACK information to the BS 303 so as to request retransmission of the erroneous data.

In steps 335 and 337, the BS 303 transmits ACK/NACK information to MS 301 either via the RS 302 or directly.

In step 323, by using the R-ACK/R-NACK information, the BS 303 transmits scheduling information to the RS 302, and thus the RS 302 can receive the uplink data, which has been successfully received from the MS 301 to the RS 302. In steps 323 and 325, the BS 303 may transmit scheduling information to the MS 301 via the RS 302 or directly. In this case, the scheduling information is provided so that the uplink data, which has not been successfully received, can be retransmitted from the MS 301 to the RS 302.

Steps 335 and 323 may be concurrently performed, and steps 337 and 325 may also be concurrently performed.

In step 327, upon receiving ACK/NACK information for uplink data transmitted directly from the BS 303 or via the RS 302, the MS 301 retransmits the erroneous data to the RS 302. In this step, the MS 303 retransmits new data stored in the queue while transmitting the erroneous data.

The RS 302 detects errors from each data received from the MS 301. While detecting errors, the RS 302 stores errorless data in an RS queue. This step is repeated between the MS 301 and the RS 302 until N pieces of data existing in the queue of the MS 301 is completely transmitted to the RS 302 without loss.

Now, a process of transmitting data from the RS 302 to the BS 303 will be described. In step 329, the RS 302 transmits to the BS 303 M errorless data stored in the RS queue. In step 331, the BS 303 receives data from the RS 302. In step 333, the BS 303 decodes the data and detects errors from the data.

In step 338, the BS 303 transmits to the RS 302 retransmission request information (R-ACK/R-NACK information) for the erroneous data. In step 339, the BS 303 transmits to the RS 302 scheduling information for uplink data. Steps 338 and 339 may be concurrently performed.

In step 341, the RS 302 retransmits the erroneous data to the BS 303. The RS 302 also transmits new data stored in the RS queue together with the erroneous data. This step is repeated between the RS 302 and the BS 303 until N pieces of data existing in the RS queue is completely transmitted to the BS 303 without loss.

Figure 4:
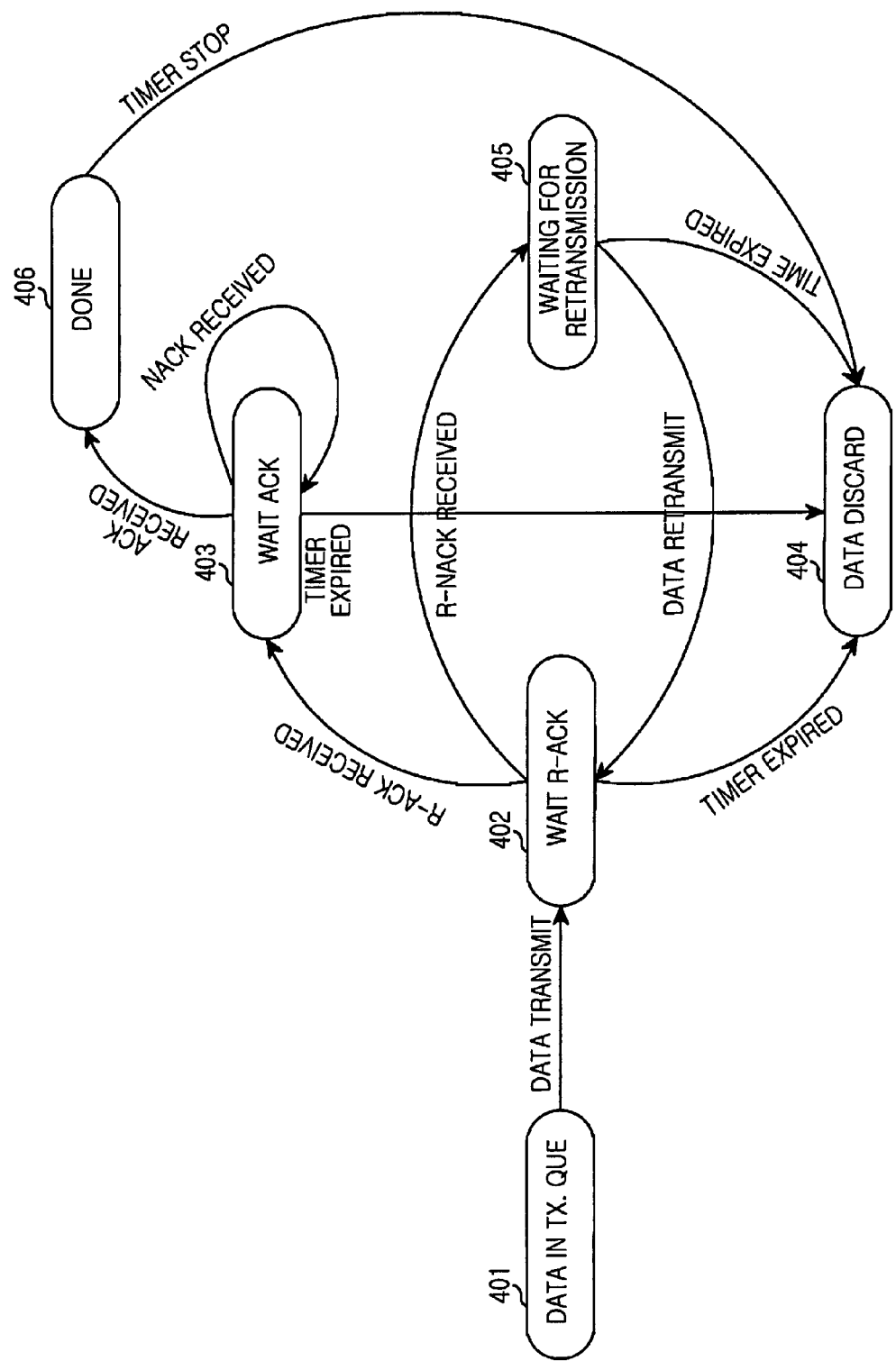
FIG. 4 is a state machine showing an ARQ state of a transmitter in a wireless communication system using a relay scheme, according to the present invention.

FIG. 4 is a state machine showing an ARQ state of a transmitter in a wireless communication system using a relay scheme, according to the present invention. The transmitter corresponds to a downlink BS and to an uplink MS. The following descriptions will be explained in the case of using a downlink BS for example. The state of the transmitter includes a 'Data in Tx. Que' state 401, a 'Wait R-ACK' state 402, a 'Wait ACK' state 403, a 'Data Discard' state 404, a 'Waiting for Retransmission' state 405, and a 'Done' state 406. Details of each state will now be described.

In the 'Data in Tx. Que' state 401, if data to be transmitted from a transmitter to an RS is not yet transmitted or cannot be transmitted, it means that the data exists in a queue of a transmitter. In this state 401, when the data existing in the queue of the transmitter is transmitted to the RS, the transmitter transmits to the 'Wait R-ACK' state 402.

The 'Wait R-ACK' state 402 is a state for waiting until an R-ACK/R-NACK message is received for some or all pieces of data transmitted/retransmitted to the RS. When the R-ACK message is received in this state 402, the transmitter transmits to the 'Wait ACK' state 403. On the other hand, when the R-NACK message is received from the RS in the 'Wait R-ACK' state 402, the transmitter transmits to the 'Waiting for Retransmission' state 405. When a timer for the data is expired, the transmitter transmits to the 'Data Discard' state 404.

The 'Wait ACK' state 403 is a state for waiting until an ACK/NACK message is received from a receiver for some or all pieces of data transmitted/retransmitted to the RS. When the ACK message is received in this state 403, the transmitter transmits to the 'Done' state 406. On the other hand, when the NACK message is received from the RS in the 'Wait ACK' state 403, the transmitter stands by in the 'Wait ACK' state 403 until the ACK message is received. When a timer for the data is expired, the transmitter transmits to the 'Data Discard' state 404.

The 'Data Discard' state 404 is a state for discarding data if the timer for the data transmitted/retransmitted to the RS is expired or if the timer is stopped when the transmitter ends its operation. Each data transmitted from the transmitter to the RS has a life-time managed by the use of a timer. When the life-time is over, the transmitter discards the data. The life-time is over in the following cases: 1) The timer is expired while in the 'Wait R-ACK' state 402, the 'Wait ACK' state 403, or the 'Waiting for Retransmission' state 405; and 2) The timer is stopped while in the 'Done' state 406.

The 'Waiting for Retransmission' state 405 is a state for waiting until some or all pieces of data transmitted/retransmitted to the RS is retransmitted. When the R-NACK message is received from the RS, the transmitter retransmits the data to the RS, and transmits to the 'Wait R-ACK' state 402. When the timer for the data is expired in the 'Waiting for Retransmission' state 405, the transmitter transmits to the 'Data Discard' state 404.

The 'Done' state 406 is a state for ending the operation of the transmitter for all data pieces transmitted/retransmitted to the RS. When an ACK message is received for all data pieces previously transmitted to the RS in the 'Wait ACK' state 403, the transmitter transmits to the 'Done' state 406, thereby ending the operation of the transmitter for the data. In this state 406, the transmitter stops the timer for the data, and then transmits to the 'Data Discard' state 404.

Figure 5:
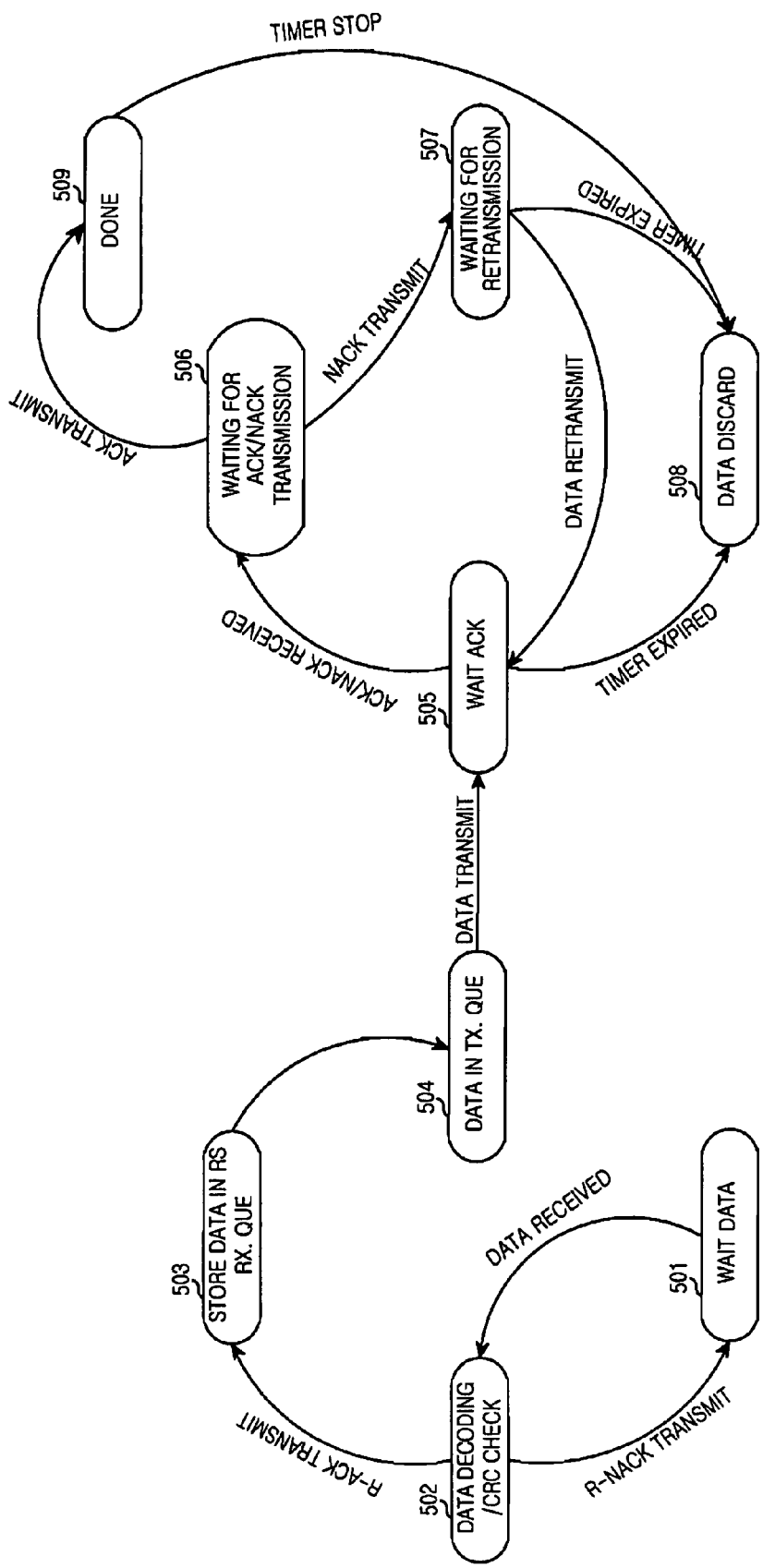
FIG. 5 is a state machine showing an ARQ state of an RS in a wireless communication system using a relay scheme, according to the present invention.

FIG. 5 is a state machine showing an ARQ state of an RS in a wireless communication system using a relay scheme, according to the present invention. A transmitter corresponds to a downlink BS and to an uplink MS. The following descriptions will be explained in the case of using a downlink BS. In addition, a receiver corresponds to a downlink MS and to an uplink BS. The following description will be explained in the case of using a downlink MS. The RS includes a receiver unit and a transmitter unit each of which has a different state. The state of the RS receiver unit includes a 'Wait Data' state 501, a 'Data Decoding/CRC Check' state 502, and a 'Store in RS Rx. Que' state 503. The state of the RS transmitter unit includes a 'Data in RS Tx. Que' state 504, a 'Wait ACK' state 505, a 'Waiting for ACK/NACK Transmission' state 506, a 'Waiting for Retransmission' state 507, a 'Data Discard' state 508, and a 'Done' state 509. Details of each state will now be described.

The 'Wait Data' state 501 is a state before data is received from the transmitter. When the data is received from the transmitter in this state 501, the RS transmits to the 'Data Decoding/CRC Check' state 502.

The 'Data Decoding/CRC Check' state 502 is a state for detecting errors from the data by performing a 'decoding/CRC check' operation on the data received. When errors are detected from the data in this state 502, the RS transmits an R-NACK message to the transmitter and then transmits to the 'Wait Data' state 501. On the other hand, when no error is detected from the data in this state 502, the RS transmits an R-ACK message to the transmitter and then transmits to the 'Store in RS Rx. Que' state 503.

The 'Store in RS Rx. Que' state 503 is a state for storing errorless data in the RS queue among the data received from the transmitter.

In the 'Data in RS Tx. Que' state 504, if data to be transmitted from the RS to the receiver is not yet transmitted or cannot be transmitted, it means that the data exists in the RS queue. In this state 504, when the data existing in the queue of the transmitter is transmitted to the receiver, the RS transmits to the 'Wait ACK' state 505.

The 'Wait ACK' state 505 is a state for waiting until an ACK/NACK message is received for some or all pieces of data transmitted/retransmitted to the receiver. When the ACK message is received in this state 505, the RS transmits to the 'Waiting for ACK/NACK Transmission' state 506. In addition, when a timer for the data is expired in this state 505, the RS transmits to the 'Data Discard' state 508.

The 'Waiting for ACK/NACK Transmission' state 506 is a state for waiting in order to transmit to the transmitter an ACK/NACK message received from the receiver. When the ACK message is received from the receiver, the RS transmits the ACK message to the transmitter in this state 506, and then transmits to the 'Done' state 509. On the other hand, when the NACK message is received from the receiver, the RS transmits the NACK message to the transmitter in this state 506, and then transmits to the 'Waiting for Retransmission' state 507.

The 'Waiting for Retransmission' state 507 is a state for waiting for retransmission of some or all pieces of data transmitted/retransmitted to the receiver. When the NACK message is received from the receiver, the RS retransmits the data to the receiver and then transmits to the 'Wait ACK' state 505. When a time for the data is expired in this state 507, the RS transmits to the 'Data Discard' state 508.

The 'Data Discard' state 508 is a state for discarding data if the timer for the data transmitted/retransmitted to the receiver is expired or if the timer is stopped when the RS ends its operation. Each data transmitted from the RS to the receiver has a life-time managed by the use of a timer. When the life-time is over, the RS discards the data. The life-time is over in the following cases: 1) The timer is expired while in the 'Wait ACK' state 505 or the 'Waiting for Retransmission' state 507; and 2) The timer is stopped in the 'Done' state 509.

The 'Done' state 509 is a state for ending the operation of the RS for all data pieces. When an ACK message is received for all data pieces in the 'Waiting for ACK/NACK Transmission' state 506, the RS transmits to the 'Done' state 509, thereby ending the operation of the RS for the data. In this state 509, the RS stops the timer for the data, and then transmits to the 'Data Discard' state 508.

Figure 6:
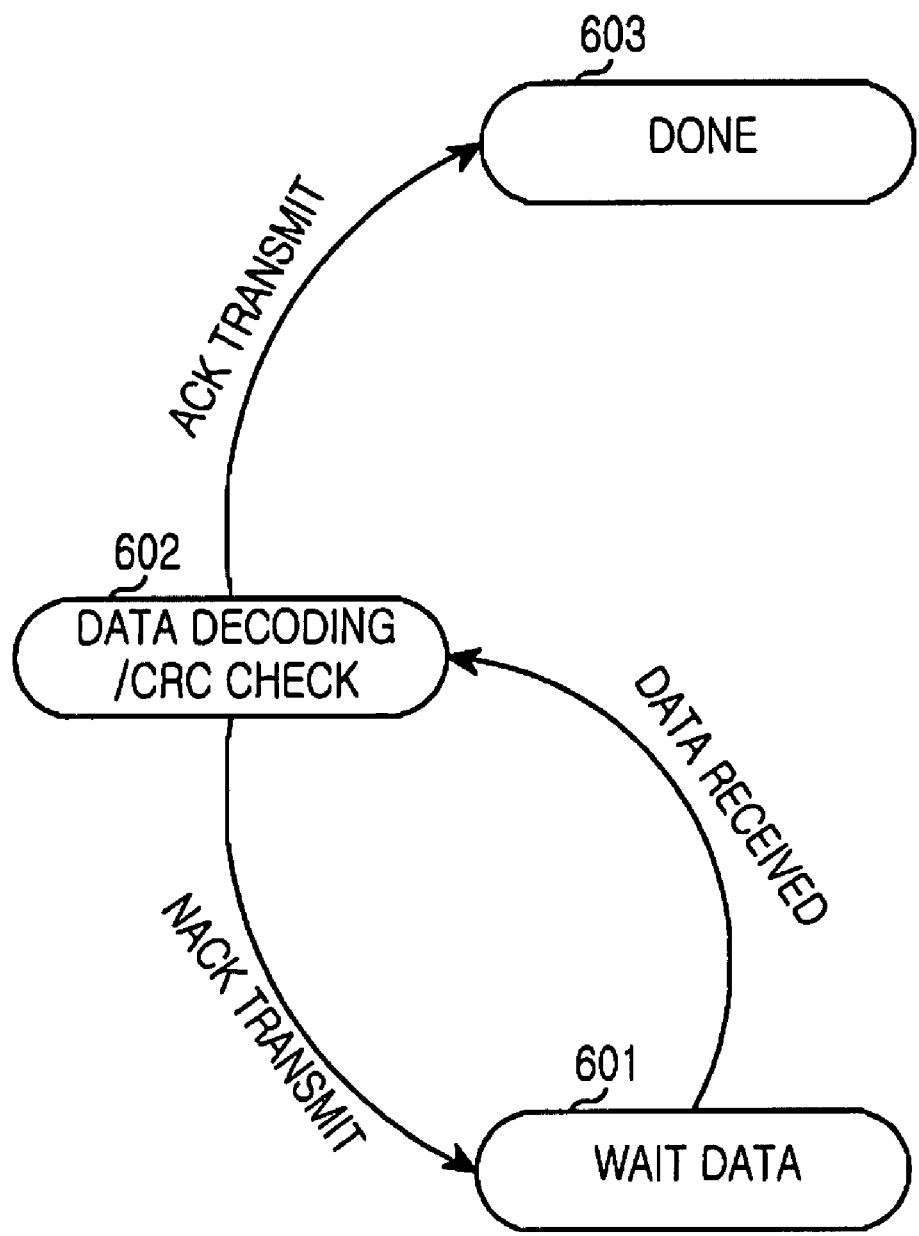
FIG. 6 is a state machine showing an ARQ state of a receiver in a wireless communication system using a relay scheme, according to the present invention.

FIG. 6 is a state machine showing an ARQ state of a receiver in a wireless communication system using a relay scheme, according to the present invention. The receiver corresponds to a downlink MS and to an uplink BS. The following descriptions will be explained in the case of using a downlink MS. The state of the receiver includes a 'Wait data' state 601, a 'Data Decoding/CRC Check' state 602, and a 'Done' state 603. Details of each state will now be described.

The 'Wait data' state 601 is a state before data is transmitted from the RS. When data is received from the RS in this state 601, the RS transmits to the 'Data Decoding/CRC Check' state 602.

The 'Data Decoding/CRC Check' state 602 is a state for detecting errors from some or all pieces of data by performing a 'decoding/CRC check' operation on the data received. When errors of the part or whole of data is detected in this state 602, the receiver transmits a NACK message to the RS so that the erroneous data can be retransmitted, and then transmits to the 'Wait data' state 601. Otherwise, the receiver transmits an ACK message to the RS and then transmits to the 'Done' state 603.

The 'Done' state 603 is a state for ending the operation of the receiver for all pieces of data.

Figure 7:
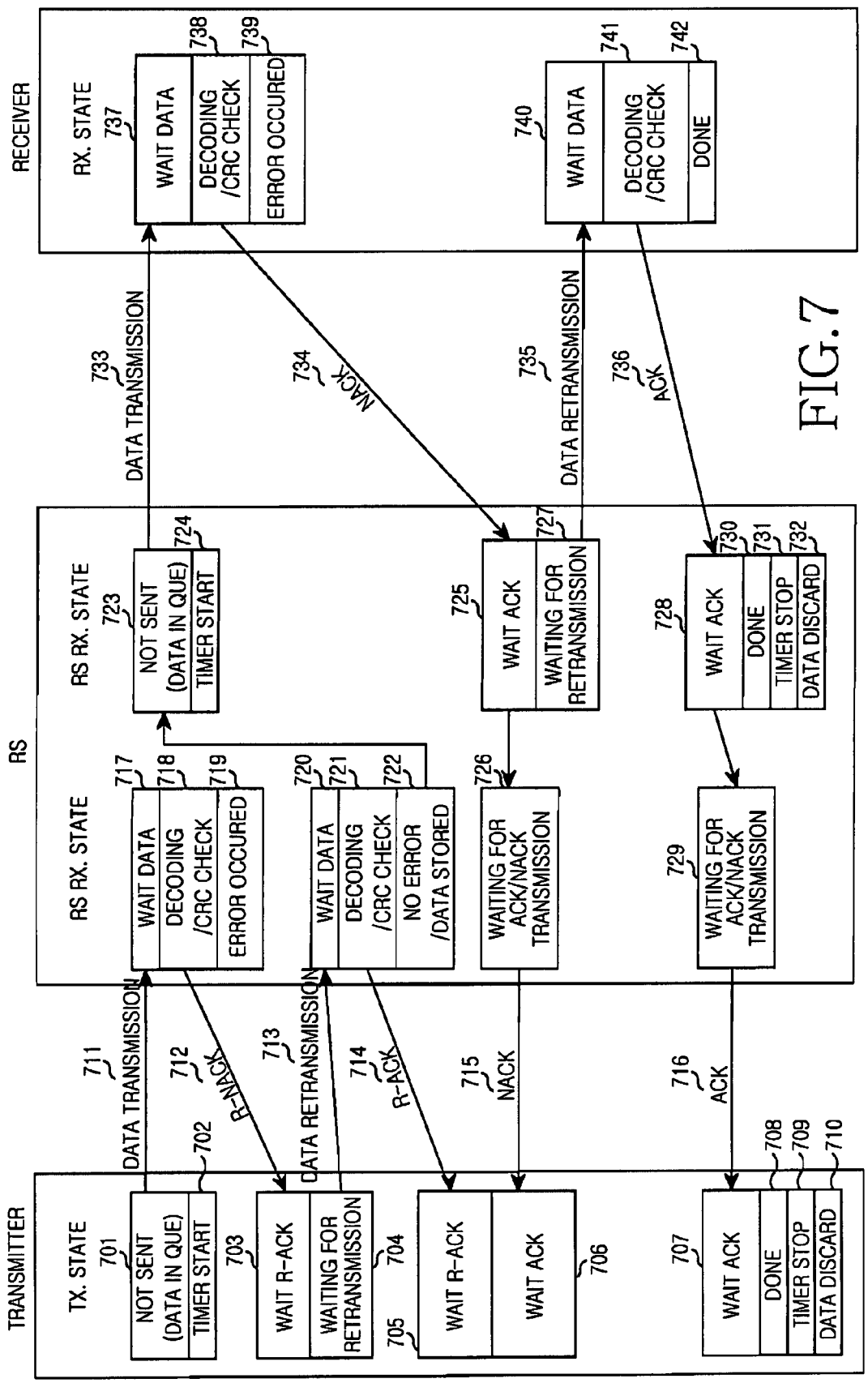
FIG. 7 illustrates state transition of a transmitter, an RS, and a receiver when performing ARQ in a wireless communication system using a relay scheme, according to the present invention.

FIG. 7 illustrates state transition of a transmitter, an RS, and a receiver when performing ARQ in a wireless communication system using a relay scheme, according to the present invention. A transmitter corresponds to a downlink BS and to an uplink MS. The following descriptions will be made in the case where a downlink BS is used. In addition, the receiver corresponds to a downlink MS and to an uplink BS. The following description will be explained in the case of using a downlink MS.

In FIG. 7, the transmitter is initially in a 'Data in Que' state 701. In this state, the transmitter wirelessly transmits data stored in a transmitter queue to an RS 711. A timer for the data starts its operation 702. The transmitter transmits to a 'Wait R-ACK' state 703.

In the mean time, the RS is initially in a 'Wait data' state for waiting data to be received 717. In this state, the RS receives data from the transmitter in a 'Wait data' state 711, and performs a 'decoding/error check' operation on the received data 718. If errors are detected from the received data 719, the RS transmits an R-NACK message to the transmitter 712, and then transmits back to the 'Wait data' state 720.

Upon receiving the R-NACK message, the transmitter transmits from the 'Wait R-ACK' state 703 to the 'Waiting for retransmission' state 704, to retransmit the data. The transmitter transmits the data to the RS 713, and then transmits back to the 'Wait R-ACK' state 705.

Upon receiving the data retransmitted 713, while in the 'Wait data' state 720, the RS performs the 'decoding/error check' operation on the data retransmitted 721. If no error is detected from the received data, the RS stores the data in an RS queue 722, transmits the R-ACK message to the transmitter 714, and transmits to the 'Data in Que' state 723 for transmitting the data to the receiver. Upon receiving the R-ACK message, the transmitter transmits from the Wait R-ACK state 705 to the 'Wait ACK' state 706.

Thereafter, in the 'Data in Que' state 723, the RS transmits data stored in an RS queue to the receiver 733, starts a timer for the data 724, and transmits to the 'Wait ACK' state 725. In the mean time, in the 'Wait data' state 737, the receiver receives the data 733 and performing the 'decoding/CRC check' operation on the received data 738. When errors are detected from the received data 739, the receiver transmits a NACK message to the RS 734 and then transmits to the 'Wait data' state 740.

Upon receiving the NACK message from the receiver 734, the RS transmits from the 'Wait ACK' state 725 to a 'Waiting for ACK/NACK transmission' state 726, and then transmits the NACK message to the transmitter 715. Thereafter, the RS transmits to a 'Waiting for retransmission' state 727, extracts data from the RS queue, and retransmits the extracted data to the receiver 735. Then, the RS transmits back to the 'Wait ACK' state 728. After the transmitter receives the NACK message 715, the transmitter remains in the 'Wait ACK' state 706 and waits until the ACK message is received.

In the 'Wait data' state 704, the receiver receives data retransmitted from the RS 735 and performing the 'decoding/CRC check' operation on the retransmission data received 741. When no error is detected from the received data, the receiver transmits the ACK message to the RS 736 and transmits to the 'Done' state 742, thereby completing a data transmission/retransmission process of the receiver.

After the RS receives the ACK message from the receiver 736, the RS transmits from the 'Wait ACK' state 728 to the 'Waiting for ACK/NACK transmission' state 729. The RS transmits the ACK message to the transmitter 716 and transmits to the 'Done' state 730, thereby completing a data transmission/retransmission process of the RS. At this time, the RS stops a timer for the data 731 and discards the data from the RS queue 732.

In the 'Wait ACK' state 707, when the transmitter receives an ACK message from the RS 716, the transmitter transmits to the 'Done' state 708, thereby completing a data transmission/retransmission process of the transmitter. At this time, the transmitter stops a timer for the data 709 and discards the data from the transmitter queue 710.

Figure 8:
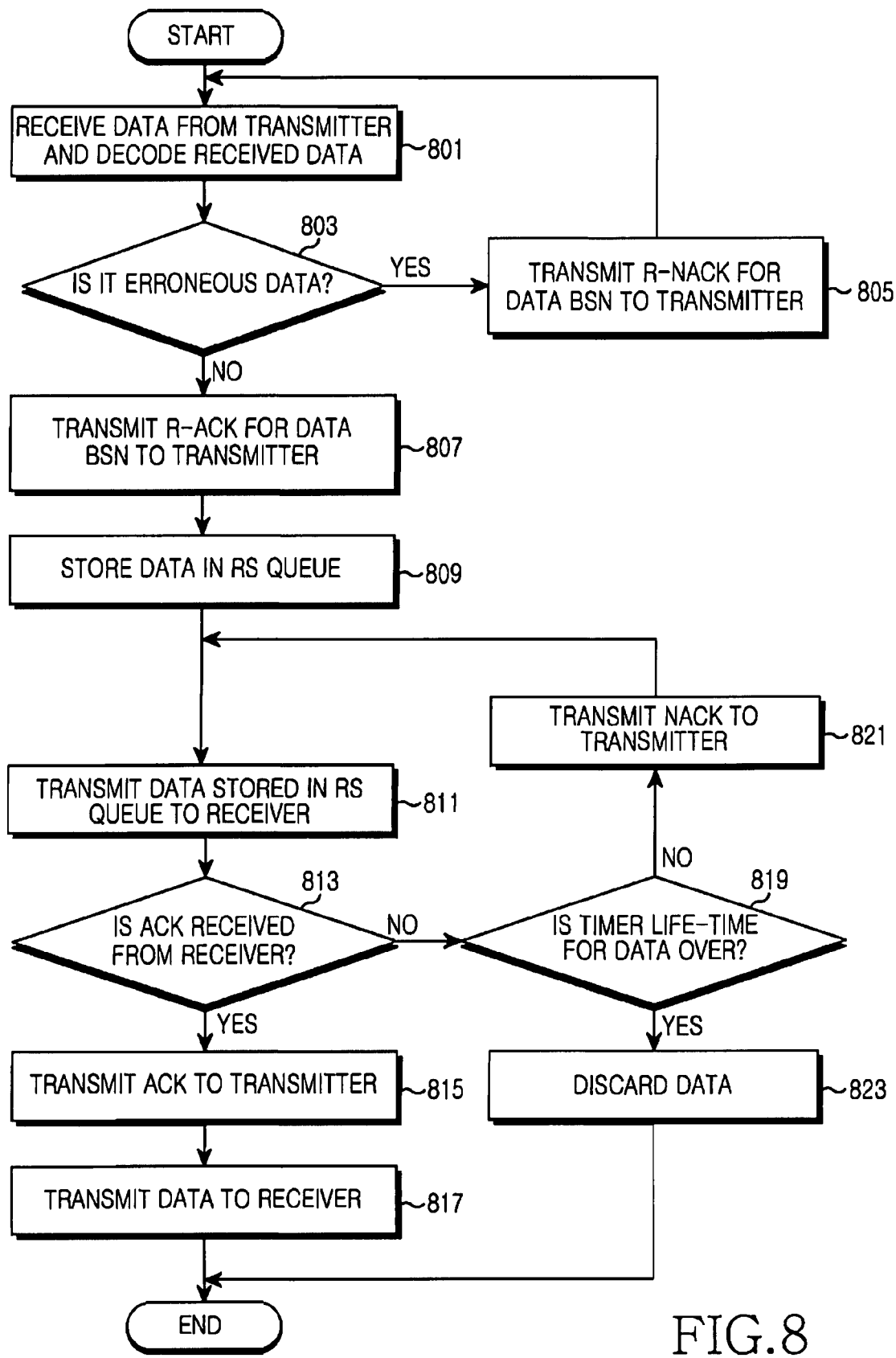
FIG. 8 is a flow diagram illustrating an ARQ process performed by an RS in a wireless communication system using a relay scheme, according to the present invention.

FIG. 8 is a flow diagram illustrating an ARQ process performed by an RS in a wireless communication system using a relay scheme, according to the present invention. A transmitter corresponds to a downlink BS and to an uplink MS. The following descriptions will be explained in the case of using a downlink BS. In addition, a receiver corresponds to a downlink MS and to an uplink BS. The following description will be explained in the case of using a downlink MS.

In FIG. 8, in step 801, data is received from the transmitter and the received data is then decoded. In step 803, in order to detect errors from the data, error checking is performed on the data, for example, by using CRC checking. When errors are detected from the data, in step 805, an R-NACK message for data BSN is transmitted to the transmitter so that erroneous data can be retransmitted. Then, the procedure returns back to step 801. When no error is detected from the data, in step 807, an R-ACK message for the data BSN is transmitted to the transmitter, and then, in step 809, errorless data is stored in an RS queue.

In step 811, the data stored in the RS queue is transmitted to the receiver. Also, in this step, a timer for the data starts its operation. In step 813, it is checked whether an ACK message is received from the receiver.

If the ACK message is received in step 813, the received ACK message is transmitted to the transmitter in step 813, and the data is transmitted to the receiver in step 817, thereby ending the procedure. At this time, a timer for the data is over, and the data stored in the RS queue is discarded.

On the other hand, if a NACK message is received in step 813, it is checked in step 819 whether a life-time of a timer for the data is over. If the life-time is not over, the received NACK message is transmitted to the transmitter in step 821. Then, the procedure returns back to step 811, and the data stored in the RS queue is transmitted to the receiver. At this time, data is retransmitted upon receiving the NACK message. If the life-time is over, the procedure proceeds to step 823 to discard the data. Then, the procedure is ended.

The transmitter retransmits data upon receiving the R-NACK message for the data which has previously been transmitted to the RS. Whereas, upon receiving the ACK message, the transmitter waits until the ACK message is received. Afterwards, upon receiving the ACK message, the transmitter discards the data from the transmitter queue. In other words, if the R-ACK message for the data is received, the transmitter waits until the ACK message is received instead of retransmitting data even when the NACK message for the data is received.

Figure 9:
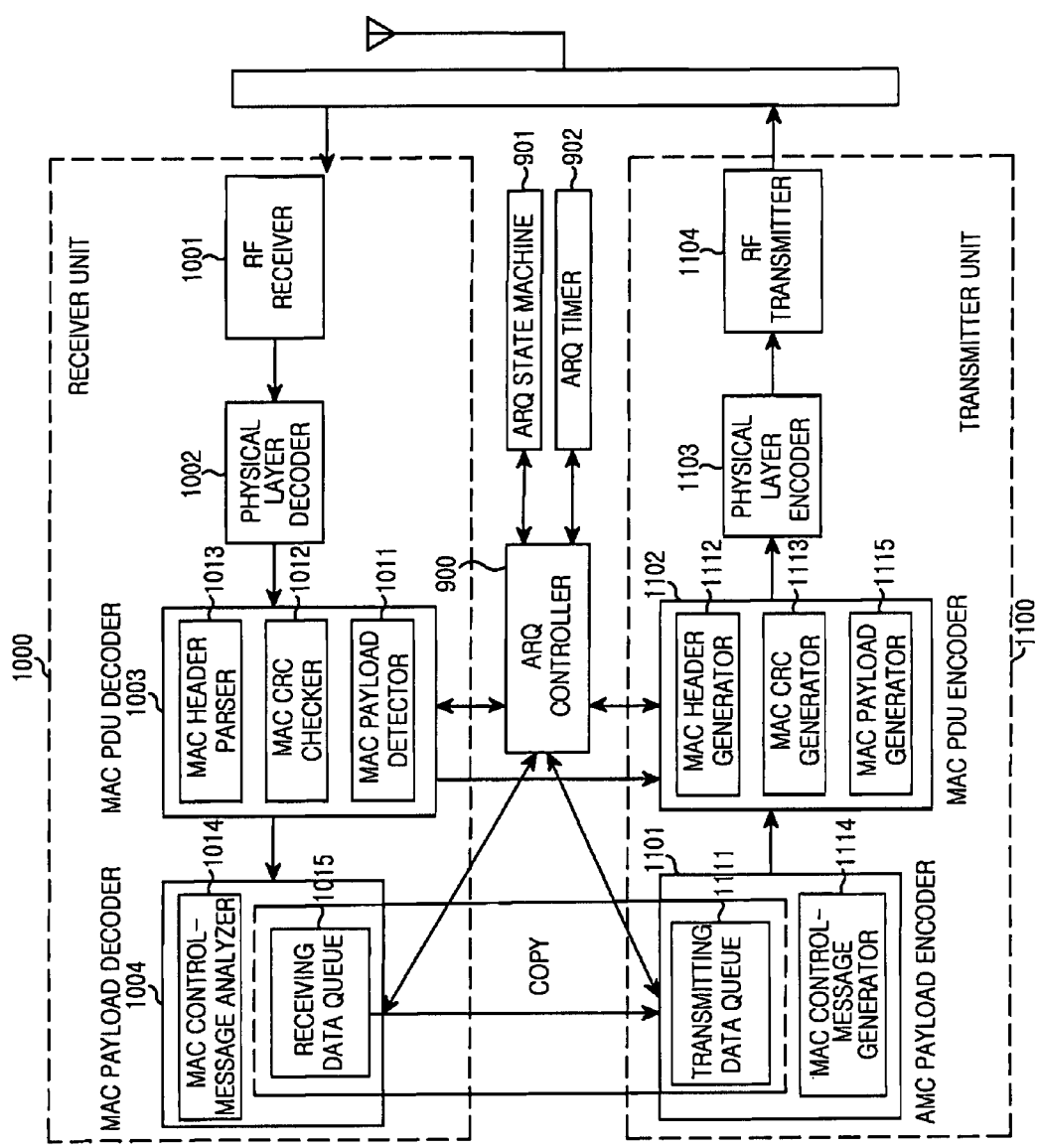
FIG. 9 is a block diagram of an RS for performing a Media Access Control (MAC) layer ARQ operation in a wireless communication system using a relay scheme, according to the present invention.

FIG. 9 is a block diagram of an RS for performing a MAC layer ARQ operation in a wireless communication system using a relay scheme, according to the present invention.

In FIG. 9, the RS roughly includes an ARQ unit, a receiver unit 1000, and a transmitter unit 1100. The receiver unit 1000 and the transmitter unit 1100 may share one antenna. Alternatively, the receiver unit 1000 and the transmitter unit 1100 may respectively include separate antennas. The receiver unit 1000 includes a Radio Frequency (RF) receiver 1001, a PHY layer decoder 1002, a MAC PDU decoder 1003, and a MAC payload decoder 1004. The transmitter unit 1100 includes a MAC payload encoder 1101, a MAC PDU encoder 1102, a PHY layer encoder 1103, and an RF transmitter 1104. The ARQ unit includes an ARQ controller 900, an ARQ state machine 901, and an ARQ timer 902.

Regarding the receiver unit 1000, the RF receiver 1001 converts an RF signal transmitted through an antenna into a base-band analog signal and converts the base-band analog signal into a digital signal. The PHY layer decoder 1002 detects original information data by decoding the digital signal received from the RF receiver 1001 and delivers it to the MAC PDU decoder 1003. The PHY layer decoder 1002 may include a modulation block, a channel demodulation block, and so on. When using an OFDM system, the modulation block may include a Fast Fourier Transform (FFT) operator for extracting data carried in sub-carrier waves, and the channel demodulation block may include a demodulator, a de-interleaver, and a channel decoder.

The MAC PDU decoder 1003 analyzes a header of a MAC PDU received from the PHY layer decoder 1002 and detects errors. Specifically, a MAC header parser 1013 analyzes the header of the MAC PDU to determine whether a payload of the MAC PDU includes control information or traffic information. In the case of including the control information, the payload of the MAC PDU is provided to a MAC control-message analyzer 1014 of the MAC payload decoder 1004. In the case of including the traffic information, the payload of the MAC PDU is stacked in a receiving-data queue 1015 of the MAC payload decoder 1004.

A MAC CRC checker 1012 separates a CRC code from the MAC PDU received from the PHY layer decoder 1002, and generates another CRC code by using the payload of the MAC PDU. Then, the MAC CRC checker 1012 determines whether the generated CRC code coincides with the separated CRC code, thereby detecting errors. A payload of errorless MAC PDU is provided to the MAC payload decoder 1004. A BSN of erroneous data and a BSN of errorless data are reported to the ARQ controller 900. The ARQ controller 900 controls the transmitter unit 1100 to transmit an ACK/NACK message for the received data to the transmitter. A MAC payload detector 1011 detects a payload from the MAC PDU received from the PHY layer decoder 1002 and provides it to the MAC payload decoder 1004. Further, the MAC payload detector 1011 transmits a BSN of the detected payload to the ARQ controller 900. The ARQ controller 900 outputs the received BSN to the MAC PDU encoder 1102.

The MAC control-message analyzer 1014 included in the MAC payload decoder 1004 analyzes control information (i.e., MAC control-message) received from the MAC PDU decoder 1003. If the MAC control-message is related to ARQ (e.g. ACK or NACK), the MAC control-message analyzer 1014 reports this to the ARQ controller 900. The receiving-data queue 1015 buffers data received from the MAC PDU decoder 1003. To be transmitted to the receiver, the buffered data is copied to a transmitting-data queue 1111 of the transmitter unit 1100 under the control of the ARQ controller 900. Although the receiving-data queue 1015 and the transmitting-data queue 1111 are separated from each other in one embodiment, one device may be shared by both a receiving-data queue and a transmitting-data queue in another embodiment.

Regarding the transmitter unit 1100, the MAC payload encoder 1101 reads data stored in the transmitting-data queue 1111 and outputs it to the MAC PDU encoder 1102. The MAC payload encoder 1101 generates a MAC control-message (e.g., ACK/NACK message) by the use of a MAC control-message generator 1114 and outputs it to the MAC PDU encoder 1102.

The MAC PDU encoder 1102 generates a payload by using data received from the MAC payload encoder 1101. Further, the MAC PDU encoder 1102 appends a header and a CRC code to the generated payload, thereby generating a MAC PDU. Then, the MAC PDU encoder 1102 outputs the generated MAC PDU to the PHY layer encoder 1103. Specifically, a MAC payload generator 1115 generates a payload by using data (traffic information) received from the MAC payload encoder 1101 or BSN information. The BSN information is input from the ARQ controller 900 and is in association with a payload managed between a BS and an MS. A MAC header generator 1112 generates a header for the generated payload and appends it to a head portion of the payload. The header may include data type (e.g., traffic information, control-message, etc.) of data contained in the payload, BSN information for ARQ, and so on. A MAC CRC generator 1113 generates a CRC code for the generated payload and appends it to a tail potion of the payload.

The PHY layer encoder 1103 encodes MAC PDUs received from the MAC PDU encoder 1102. The PHY layer encoder 1103 may include a channel encoding block, a demodulation block, and so on. When using an OFDM system, the channel coding block may include a channel encoder, an interleaver, a modulator, and so on, and the demodulation block may include an Inverse Fast Fourier Transform (IFFT) operator by which transmission data is carried on a plurality of sub-carriers which are orthogonal from each other.

The RF transmitter 1104 converts a base-band digital signal received from the PHY layer encoder 1103 into an analog signal. Further, the RF transmitter 1104 converts the base-band analog signal into an RF signal and transmits it through an antenna.

The ARQ state machine 901 manages an ARQ state for data retransmitted. The ARQ timer 902 manages a life-time timer for respective data blocks transmitted. The ARQ controller 900 controls overall ARQ operations in cooperation with the ARQ state machine 901 and the ARQ timer 902. For example, when a response message is received with respect to the MAC PDUs transmitted to the receiver, the ARQ controller 900 analyzes it so that data is retransmitted upon receiving a NACK message, and data is discarded from the transmitting-data queue 1111 upon receiving an ACK message, under the control of the ARQ controller 900.

In the aforementioned embodiment, a time for receiving data from the transmitter, a time for relaying data to the receiver, a time for transmitting a response ACK/NACK for data received from the transmitter, and a time for receiving the response for the data transmitted from the receiver are not directly related to the present invention. Thus, descriptions thereof will not be explained in detail. Time and resources used for communication among a BS, an RS, and an MS are related to a frame structure, and detailed description thereof will be omitted.

Figure 10:
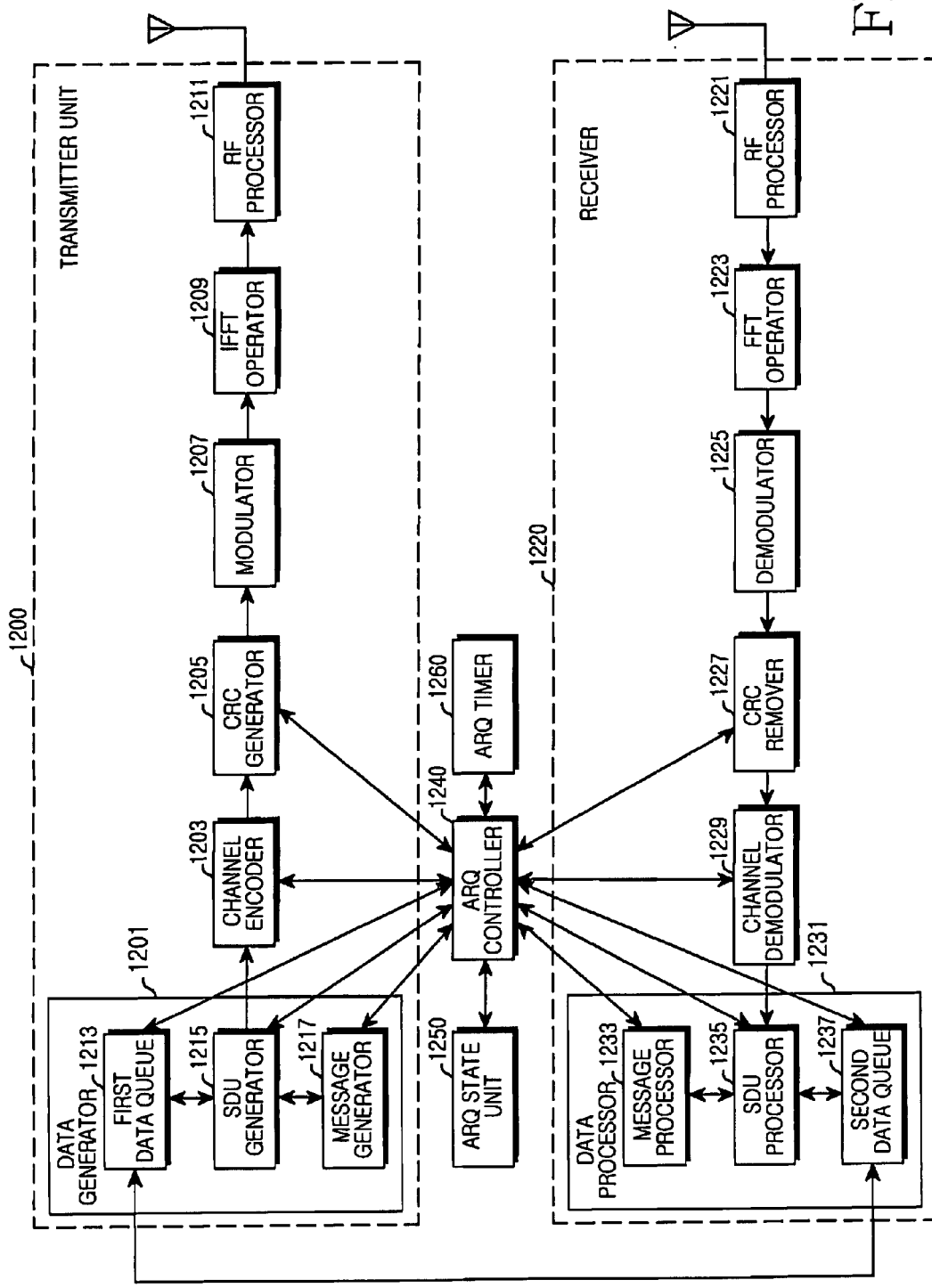
FIG. 10 is a block diagram of an RS for performing a Physical (PHY) layer HARQ operation in a wireless communication system using a relay scheme, according to the present invention.

FIG. 10 is a block diagram of an RS for performing a PHY layer HARQ operation in a wireless communication system using a relay scheme, according to the present invention. In the descriptions below, a transmitter unit 1200 and a receiver unit 1220 assume to use different antennas. However, the transmitter unit 1200 and the receiver unit 1220 may share one antenna.

In FIG. 10, the RS includes the transmitter unit 1200, the receiver unit 1220, an ARQ controller 1240, an ARQ state unit 1250, and an ARQ timer 1260.

The transmitter unit 1200 includes a data generator 1201, a channel encoder 1203, a CRC generator 1205, a modulator 1207, an IFFT operator 1209, and an RF processor 1211.

The data generator 1201 collects data stored in a first data queue 1213 and a control-message generated by a message generator 1217 by using a Service Data Unit (SDU) generator 1215 and thus generates data for PHY layer transmission. Upon receiving errorless data from the receiver unit 1220, the message generator 1217 generates an ACK message. Upon receiving erroneous data, the message generator 1217 generates a NACK message.

The channel encoder 1203 encodes data received from the data generator 1201 according to a relevant modulation level (e.g., Modulation and Coding Scheme (MCS) level). The CRC generator 1205 generates an error detection code and adds it to data received from the channel encoder 1203. The modulator 1207 modulates data received from the CRC generator 1205 according to a relevant modulation level (e.g., MCS level). The IFFT operator 1209 performs an IFFT operation on frequency-domain data received from the modulator 1207 and thus transforms it into a time-domain signal.

The RF processor 1211 modulates a base-band signal received from the IFFT operator 1209 into an RF signal, and outputs it to a transmitter or a receiver through an antenna. For example, the RF processor 1211 transmits to the BS an ACK/NACK message for data received from the transmitter. Further, the RF processor 1211 transmits to the receiver data received from the transmitter.

The receiver unit 1220 includes an RF processor 1221, a FFT operator 1223, a demodulator 1225, a CRC remover 1227, a channel demodulator 1229, and a data processor 1231.

The RF processor 1221 down-modulates the RF signal received from the transmitter through the antenna into a baseband signal. The FFT operator 1223 performs a FFT operation on a time-domain signal received from the RF processor 1221, thereby obtaining a frequency-domain signal. The demodulator 1225 demodulates a signal received from the FFT operator 1223 according to a relevant modulation level. The demodulator 1225 outputs the demodulated signal to the CRC remover 1227.

The CRC remover 1227 checks an error detection code of a signal received from the demodulator 1225 so as to determine whether the signal has an error. The CRC remover 1227 removes the error detection code from the signal received from the demodulator 1225. According to the relevant modulation level, the channel demodulator 1229 demodulates an errorless signal received from the CRC remover 1227.

An SDU processor 1235 of the data processor 1231 separates data and a control-message from a PHY layer signal received from the channel demodulator 1229. The SDU processor 1235 then provides the data to a second data queue 1237, to store the data in the second data queue 1237. The SDU processor 1235 provides the control-message to a message processor 1233. Although the first data queue 1213 and the second data queue 1237 are separately shown in the figure, the first data queue 1213 and the second data queue 1237 may be composed of one data queue. The message processor 1233 decodes an ACK/NACK message received from the BS and transmits it to the ARQ controller 1240. The message processor 1233 reports to the ARQ controller 1240 information on data to be retransmitted at the request of the BS.

The ARQ state unit 1250 manages an ARQ state for data retransmitted. The ARQ timer 1260 manages a life-time for retransmitting data at the request of the RS.

The ARQ controller 1240 controls overall ARQ operations of the RS in cooperation with the ARQ state unit 1250 and the ARQ timer 1260. For example, upon receiving information on the ACK/NACK message from the message processor 1233, the ARQ controller 1240 controls data on an ACK message to be discarded from the first data queue 1213 according to the information on the ACK/NACK message. Further, the ARQ controller 1240 controls the data generator 1201, the channel encoder 1203, and the CRC generator 1205 so that data on the NACK message is retransmitted to the receiver. When a message for ending the life-time is received from the ARQ timer 1260 while the retransmission process is performed, the ARQ controller 1240 terminates the retransmission of the data.

According to the present invention, ARQ can be effectively performed when a new network element (i.e., RS) is provided to relay data in a wireless communication system. In particular, when the RS transmits to the transmitter retransmission request messages received from one or more receivers, all MS retransmission request messages received in a current uplink segment are integrated into one message and the integrated message is transmitted to the transmitter, thereby more effectively transmitting an ARQ feedback message. Therefore, overhead can be significantly reduced as compared with a convention case when respective messages are separately generated and transmitted. In addition, when data is retransmitted to the receiver by using the RS, the BS controls all ARQ operations, and the RS transmits to the receiver the control-message and data transmitted by the transmitter under the control of the BS.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A retransmission method for a Relay Station (RS) in a wireless communication system, the method comprising:
   receiving data from a transmitter, and transmitting the received data to one or more receivers;
   receiving Acknowledgment (ACK)/Negative-Acknowledgment (NACK) information for the data received from the one or more receivers, and transmitting the received ACK/NACK information to a Base Station (BS); and
   if scheduling information for transmitting or retransmitting data between the RS and the receiver is received from the BS, transmitting the received scheduling information to the receiver.

2. The method of claim 1, wherein transmitting the received data to one or more receivers comprises:
   detecting errors from the received data;
   storing errorless data among the received data in an RS queue; and
   transmitting the data stored in the RS queue to the one or more receivers.

3. The method of claim 2, further comprising generating Relay Station-Negative-Acknowledgement (R-NACK) information for erroneous data among the received data and Relay Station-Acknowledgement (R-ACK) information for the errorless data, and transmitting the R-NACK/R-ACK information to the transmitter.

4. The method of claim 3, further comprising receiving the erroneous data retransmitted from the transmitter.

5. The method of claim 1, further comprising ending the retransmission operation for the data when ACK information is received from the receiver, and retransmitting the data when NACK information is received from the receiver.

6. The method of claim 1, wherein the ACK/NACK information is selected from a group consisting of a Connection ID (CID) of the receiver, an ACK type for designating a response type, a Block Sequence Number (BSN) for designating a sequence number of an ARQ block, and, if the response type is a selective ACK, an ACK map for designating whether each ARQ block has been successfully received.

7. The method of claim 6, wherein the BSN and the ACK type are parameters managed between the transmitter and the receiver and are determined by the BS.

8. The method of claim 1, wherein the ACK/NACK information received from the one or more receivers is integrated into one piece of information and is then transmitted to the BS through a single message.

9. The method of claim 8, wherein the integrated information includes at least one piece of information selected from a group consisting of the number of ACK types, the number of receivers using the same ACK type for the respective ACK types, and ACK/NACK information for each receiver.

10. The method of claim 8, wherein the ACK/NACK information is received from a plurality of uplink segments.

11. The method of claim 1, further comprising receiving, from the BS, scheduling information for transmitting or retransmitting data between the transmitter and the RS and/or scheduling information for transmitting or retransmitting data between the RS and the receiver.

12. The method of claim 11, wherein the scheduling information is a MAP message.

13. An apparatus for retransmission of a Relay Station (RS) in a wireless communication system, the apparatus comprising:
    a receiver unit for receiving data from a transmitter and for receiving Acknowledgment (ACK)/Negative-Acknowledgment (NACK) information for the data from one or more receivers; and
    a transmitter unit for transmitting the data received from the transmitter to the one or more receivers, and transmitting to a Base Station (BS) the ACK/NACK information received from the one or more receivers,
    wherein if scheduling information for transmitting or retransmitting data between the RS and the receiver is received from the BS, the received scheduling information is transmitted to the receiver.

14. The apparatus of claim 13, wherein the receiver unit comprises:
    an element for detecting errors from the received data; and
    an element for storing errorless data among the received data in an RS queue,
    wherein the transmitter unit transmits the data stored in the RS queue to the one or more receivers.

15. The apparatus of claim 14, wherein the transmitter unit generates Rely Station-NACK (R-NACK) information for erroneous data among the received data or Relay Station-Acknowledgement (R-ACK) information for the errorless data, and transmits the generated information to the transmitter.

16. The apparatus of claim 14, wherein the transmitter unit receives the erroneous data retransmitted from the transmitter.

17. The apparatus of claim 13, further comprising a controller for ending the retransmission operation for the data when ACK information is received from the receiver and controlling the transmitter to retransmit the data when NACK information is received from the receiver.

18. The apparatus of claim 13, wherein the ACK/NACK information is selected from a group consisting of a Connection ID (CID) of the receiver, an ACK type for designating a response type, a Block Sequence Number (BSN) for designating a sequence number of an ARQ block, and, if the response type is a selective ACK, an ACK map for designating whether each ARQ block has been successfully received.

19. The apparatus of claim 18, wherein the BSN and the ACK type are parameters managed between the transmitter and the receiver and are determined by the BS.

20. The apparatus of claim 13, wherein the transmitter unit integrates the ACK/NACK information received from the one or more receivers into one piece of information and transmits the integrated information to the BS through a single message.

21. The apparatus of claim 20, wherein the integrated information includes at least one piece of information selected from a group consisting of the number of ACK types, the number of receivers using the same ACK type for the respective ACK types, and ACK/NACK information for each receiver.

22. A method of retransmission of a Relay Station (RS) in a wireless communication system, the method comprising:
    receiving data from a transmitter, generating Relay Station-Acknowledgment (R-ACK)/Rely Station-Negative-Acknowledgment (R-NACK) information for the received data, and transmitting the generated R-ACK/R-NACK information to a Base Station (BS);
    receiving ACK/NACK information equivalent to the R-ACK/R-NACK information from the BS, and transmitting the received ACK/NACK information to the transmitter; and
    if scheduling information for transmitting or retransmitting data between the transmitter and the RS is received from the BS, transmitting the received scheduling information to the transmitter.

23. The method of claim 22, wherein the step of transmitting to the BS the R-ACK/R-NACK information for the received data further comprises:
    detecting errors from the data received from the transmitter; and
    generating the R-NACK information for erroneous data among the received data and the R-ACK information for the errorless data, and transmitting the generated R-ACK/R-NACK information to the BS.

24. The method of claim 23, further comprising receiving the erroneous data retransmitted from the transmitter.

25. The method of claim 23, further comprising:
    storing the errorless data in an RS queue; and
    transmitting the data stored in the RS queue to a receiver.

26. The method of claim 25, further comprising ending the retransmission operation for the data when the ACK information is received from the receiver and retransmitting the data when the NACK information is received from the receiver.

27. The method of claim 26, wherein the ACK/NACK information is selected from a group consisting of a Connection ID (CID) of the receiver, an ACK type for designating a response type, a Block Sequence Number (BSN) for designating a sequence number of an ARQ block, and, if the response type is a selective ACK, an ACK map for designating whether each ARQ block has been successfully received.

28. The method of claim 27, wherein the BSN and the ACK type are parameters managed between the transmitter and the receiver and are determined by the BS.

29. The method of claim 22, further comprising receiving, from the BS, scheduling information for transmitting or retransmitting data between the transmitter and the RS and/or scheduling information for transmitting or retransmitting data between the RS and the receiver.

30. The method of claim 29, wherein the scheduling information is a MAP message.

31. An apparatus for retransmission of a Relay Station (RS) in a wireless communication system, the apparatus comprising:
    a receiver unit for receiving data from a transmitter and then receiving, from a Base Station (BS), Acknowledgement (ACK)/Negative-Acknowledgment (NACK) information equivalent to Relay Station-Acknowledgement (R-ACK)/Relay Station-Negative-Acknowledgement (R-NACK) information; and
    a transmitter unit for generating the R-ACK/R-NACK information for the data received from the transmitter, transmitting the generated R-ACK/R-NACK information to the BS, and then transmitting to the transmitter the ACK/NACK information received from the BS,
    wherein if scheduling information for transmitting or retransmitting data between the transmitter and the RS is received from the BS, the received scheduling information is transmitted to the transmitter.

32. The apparatus of claim 31, wherein the receiver unit comprises an element for detecting errors from the data received from the transmitter, and wherein the transmitter unit generates the R-NACK information for erroneous data among the data received from the transmitter and R-ACK information for the errorless data, and transmitting the generated R-ACK/R-NACK information to the BS.

33. The apparatus of claim 32, wherein the receiver unit receives the erroneous data retransmitted from the transmitter.

34. The apparatus of claim 32, wherein the receiver unit comprises an element for storing the errorless data in an RS queue, and wherein the transmitter unit transmits the data stored in the RS queue to a receiver.

35. The apparatus of claim 34, further comprising a controller, which, upon receiving the ACK/NACK information from the receiver, ends the retransmission operation for the data if the ACK information is received from the receiver, and controls the transmitter to retransmit the data if the NACK information is received from the receiver.

36. The apparatus of claim 35, wherein the ACK/NACK information is selected from a group consisting of a Connection ID (CID) of the receiver, an ACK type for designating a response type, a Block Sequence Number (BSN) for designating a sequence number of an ARQ block, and, if the response type is a selective ACK, an ACK map for designating whether each ARQ block has been successfully received.

37. The apparatus of claim 36, wherein the BSN and the ACK type are parameters managed between the transmitter and the receiver and are determined by the BS.

* * * * *